Nov. 25, 1941.    J. H. WRIGLEY ET AL    2,263,712
PROCESS OF AND APPARATUS FOR SHRINKING FABRICS AND YARNS
Filed March 16, 1940    7 Sheets-Sheet 1

Inventors
John H. Wrigley
Alexander Melville
by
Wright, Brown, Quinby & May
Attorneys Nov. 25, 1941. J. H. WRIGLEY ET AL 2,263,712
PROCESS OF AND APPARATUS FOR SHRINKING FABRICS AND YARNS
Filed March 16, 1940 7 Sheets-Sheet 2

Inventors
John H. Wrigley
Alexander Melville
by
Attorneys

Nov. 25, 1941. J. H. WRIGLEY ET AL 2,263,712
PROCESS OF AND APPARATUS FOR SHRINKING FABRICS AND YARNS
Filed March 16, 1940 7 Sheets-Sheet 5

Inventors
John H. Wrigley
Alexander Melville
by
Wright, Brown, Quinby & May
Attorneys Patented Nov. 25, 1941

2,263,712

UNITED STATES PATENT OFFICE 2,263,712

PROCESS OF AND APPARATUS FOR SHRINKING FABRICS AND YARNS

John Herbert Wrigley, Worthington, near Wigan, and Alexander Melville, Standish, near Wigan, England, assignors to The Bradford Dyers' Association Limited, Bradford, England, a British company Application March 16, 1940, Serial No. 324,382
In Great Britain March 20, 1939

21 Claims. (Cl. 26—18.6)

It is well known that all textile fabrics which have been manufactured and processed in the ordinary way shrink when they are laundered or even moistened. One of the main causes of shrinkage is to be found in the resilience of the individual fibres. This is such that both yarns and fabrics stretch during the processes of manufacture and they are thus internally mechanically stressed. The mechanical stresses are relieved when the yarns and fabrics are laundered or become damp, so that the fibres return to their original length. Mechanical shrinking can be used to reduce the length of the stretched fibres. Fibres vary very much in their resilience, and fabrics made from cotton yarn can be mechanically shrunk to such an extent that they will resist further shrinkage during subsequent laundering. Indeed, increasing use is now being made of mechanical treatment, applied to the fabric before it is marketed, to shrink it in the piece to the same extent as garments made from non-shrunk fabric would shrink when laundered.

Wool fibres are much more resilient than cotton fibres, and during the processes of manufacture are readily set in the stretched condition. The stresses imposed by this may be released by soaking the yarn or fabric in water, but hitherto no mechanical method of releasing them to any substantial extent has been devised.

Another cause of shrinkage of woollen or worsted yarns or fabrics is their tendency to "felt" when subjected to repeated laundering.

The invention provides a method by which the tendency of woollen or worsted yarns or fabrics to shrink as a result of the release of their internal mechanical stresses is very much reduced, but it is not alleged that shrinkage caused by felting can be avoided by means of the invention. Nevertheless, since woven woollen and worsted fabrics, such as suitings, can be relieved of a substantial part of the internal stress in the fibres, they become much more resistant to shrinkage caused by dampness, i. e. they are, for example, more resistant to wetting by rain, so that the invention presents substantial advantages. In addition, the machines used according to the invention may be used with advantage for shrinking other textile fabrics, including in particular thick fabrics, and also yarns, as the machines can be more easily adjusted to give different degrees of shrinkage and thus to suit different fabrics or yarns than the machines at present in use.

According to the present invention, a fabric or yarn while travelling is nipped twice along its length in such a way that it moves faster at the first nip than at the second nip, and over the length between the two nips it is so confined between the walls of a confining passage as to prevent it from buckling as a whole, but is allowed to slip or slide for self-adjustment over both walls of the confining passage. Thus the fabric is unable to crumple in such a way that its surface becomes uneven; rather it retains a smooth surface and is compressed longitudinally between the two nips, so that it shrinks longitudinally, i. e. in its direction of travel, and becomes thicker.

After leaving the second nip, the fabric expands, but not to its original length, so the degree of shrinkage as measured by the ratio of the rates of travel at the two nips must be greater than that which it is desired to impart by the process. There is no need to employ any setting process to retain the shrinkage imparted by the process of the invention, although naturally if the fabric is moist, as is preferred, it may be passed through a drier after leaving the last nip.

It is preferred to effect the shrinkage in a single stage, but it is within the invention to use two stages, that is to say, more than two nips with a confining passage between each pair of nips.

The extent of the confinement of the fabric in its travel between the two nips is critical. Either or both of the walls between which the fabric is confined may be made of rigid material, and they may be maintained at a fixed distance apart from one another, but preferably at least one is made yieldable or is resiliently mounted and pressure, which may be variable, is applied to tend to close the gap between the walls of the confining passage. Thus the gap between the walls may be accurately adjusted to suit the fabric, or the degree of pressure may be varied. In any case the gap must neither be too large, because then the fabric tends to buckle as a whole in travelling between the walls and is not shrunk, nor too small, because then the fabric will not pass between the walls at all. Equally, when one of the walls is yieldable or resiliently-mounted, the applied pressure must be great enough to prevent buckling as a whole, but not so great as to clamp the fabric to a moving surface in such a way that no movement of any thread relatively to that surface is possible. It is easy to determine the necessary conditions for any given fabric by making one or two tests. Since the fabric becomes thicker as it is compressed longitudinally, it is convenient to make the opposed walls diverge from the first nip to the second nip.

The apparatus according to the invention is so arranged as a whole that the fabric, while actually being shortened, slips or slides with respect to at least part of both the opposed confining walls, and this involves correlation of the nature of the means for introducing the fabric into the confining passage with the nature of the means for retarding the fabric to prevent it from leaving the confining passage at as high a rate as it enters the passage, and also with the nature of the walls of the passage itself. The retarding means preferably includes two forwardly-moving surfaces between which the fabric is nipped, but it may include a stationary element or even a backwardly-moving smooth surface. The engagement of the fabric by the preferred form of retarding means may be frictional or positive. When the retarding means includes a stationary surface over which the fabric slides, this is of such a nature that it engages the fabric frictionally so as to retard its onward movement.

In the preferred apparatus, the fabric is frictionally engaged at each end of the confining passage, and one at least of the moving surfaces in the retarding means is driven at a rate which is slower than that at which the fabric is introduced into the confining passage. Moreover, one wall of the latter may be stationary and the other may move. Such a moving wall may be constituted by part of an element which co-operates both with another moving element to form the introducing means, and with a moving or stationary element to constitute the retarding means.

The degree of shrinkage imparted to the fabric can be readily controlled, for example by varying the speed of a moving element in the retarding means in relation to the speed of the fabric at the first nip. In cases in which the retarding means comprises a stationary surface which exerts a retarding action on the fabric, shrinkage control may be accomplished by varying the pressure of this surface on the fabric, or by replacing one stationary element by another that affords a different frictional resistance to the fabric.

The moving elements in the apparatus are preferably rollers, and they may advantageously be covered with rubber to render their surfaces yieldable. However, they may also take the form of endless bands. The surfaces of metal elements that are to exert a frictional grip may be milled or otherwise roughened, and if they are to grip the fabric positively they may be spiked.

In the preferred forms of apparatus, the stationary wall of the confining passage is formed by a smooth-surfaced plate. This is preferably highly polished, and it is found that the degree of polish may affect the degree of shrinkage. The moving wall opposite such a plate may be formed by the surface of a roller that also co-operates with another roller to form the retarding means, and in the preferred form of apparatus co-operates with a third roller to form the means for introducing the fabric into the confining passage.

The invention will now be described in fuller detail with reference to the accompanying drawings which illustrate by way of example some of the various ways in which it may be carried into effect. In these drawings.

Figure 1:
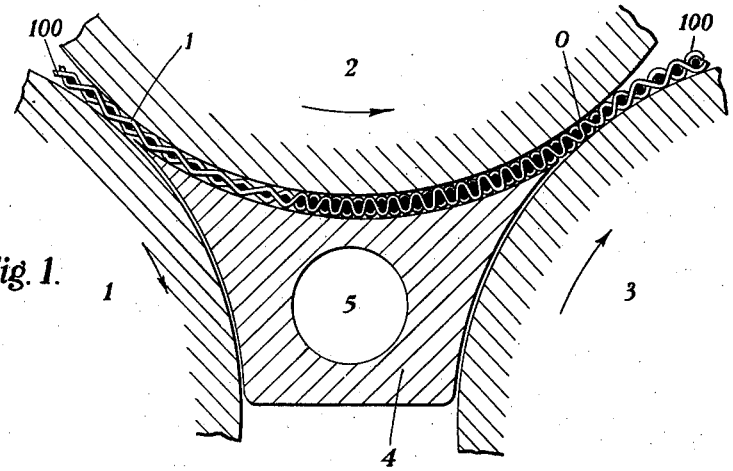
Figure 1 shows diagrammatically and in section the co-operating parts of the three rollers and stationary plate of the preferred form of apparatus referred to above.

Figure 1 illustrates the principle of operation of the preferred form of apparatus, in which three rollers 1, 2 and 3 are arranged with their axes horizontal and parallel to one another. The rollers 1 and 3 are spaced apart, and the roller 2 is disposed above them and rests on them. The rollers are all of the same size and are of metal covered with rubber. The covering of the upper roller 2 is of harder and smoother rubber than the other two. Thus, the hardness of the surfaces of the rollers 1 and 3 may be 60° and that of the upper roller 2 may be 85°, as indicated by the hardness-testing instrument known as the "Shore durometer," so that the surfaces of the rollers 1 and 3 are softer and thus are able to exert a more powerful frictional grip on the fabric than that of the roller 2. A plate 4, which is preferably of metal, is arranged beneath the upper roller 2 and between the rollers 1 and 3. It has a smooth, highly-polished upper surface having approximately the same curvature as the roller 2, from which it may be slightly spaced even when the roller 2 is resting on the rollers 1 and 3. The confining passage is formed between the roller 2 and the plate 4. The plate 4 is arranged in the space between the rollers 1, 2 and 3 in such a way that its upper surface is substantially tangential to the surfaces of the two lower rollers 1 and 3 at the points where the plate ends, these being close to the nips between the rollers. The upper surface of the plate 4 thus constitutes virtually a continuation of the surfaces of rollers 1 and 3. The rollers 1 and 3 are driven in the same direction, as indicated by the arrows in Figure 1, but the roller 3, which may be termed the retarding roller, is driven so that its surface moves at a lower speed than the surface of the roller 1, which may be termed the feed roller. The upper roller 2 is in this example driven at the same surface speed or at about the same surface speed as the feed roller 1 but in the reverse direction of rotation. The fabric, indicated by 100, passes into and through the nip (denoted by I) between the rollers 1 and 2. Next it passes into the confining passage formed between the lower part of the roller 2 and the upper surface of the plate 4, then into the nip (denoted by O) between the upper roller 2 and the third roller 3, and is then led away.

The upper roller 2, which is subjected to downward pressure, has four functions. In the first place it co-operates with the feed roller 1 to introduce the fabric into the confining passage. Secondly, it co-operates with the retarding roller 3 to form the retarding means. Thirdly, the lower part of its surface forms one of the walls of the confining passage. Fourthly, this upper roller assists in causing the fabric to travel through the confining passage.

The fabric enters at the nip I at a speed equal or about equal to the surface speed of the rollers 1 and 2, and is engaged frictionally by these two rollers but mainly by the softer roller 1. It then passes into the confining passage, where the surface of the roller 2, although it is smoother than that of the roller 1, exerts some grip on the fabric and helps to convey it. At the end of the passage the fabric is acted upon by the retarding roller 3. This roller exerts a more powerful frictional grip on the fabric than the roller 2, so much so that it only allows the fabric to proceed at or at about its own surface speed, "taking charge" of the fabric as it were from the roller 2, although it is rotating at a higher speed than the roller 3. It should be observed that although it is a function of the roller 2 to cooperate with the roller 3 to form the retarding device, the roller 2 does not itself exert a retarding action on the fabric, but the portion of its surface adjacent to the retarding roller 3 acts as a means for holding the fabric in frictional engagement with the surface of that roller. The roller 3 exerts as it were a back-pressure on the fabric, which, however, continues to be fed forwards at I at a higher speed than that at which the roller 3 allows it to pass out at O, that is to say, the rate of travel of the fabric decreases between the nips I and O. Since the fabric is so confined between these points that it cannot buckle as a whole, the force exerted on the fabric in the direction of its length causes the fabric to become shortened in that direction, this being indicated in Figure 1 by the closer spacing of the transverse threads. This leads to thickening of the fabric, and therefore the plate 4 is so arranged that the gap between it and the roller 2 gradually widens, as is clearly shown in Figure 1. Since the surface of the roller 2 is rubber-covered, it can yield to some extent to allow the fabric to thicken if the arrangement of the plate does not entirely provide for this. The same effect can be produced by resiliently mounting either the roller 2 or the plate 4. Of course, the parts may be made adjustable, so that the shape of the passage can be varied as required. It appears that there is some extra build-up or thickening just before the nip O, and for this reason a small gap between the edge of the plate 4 and the roller 3 seems to be advantageous rather than otherwise.

It will readily be seen that the fabric must slide or slip with respect to both the confining walls while being actually shortened. The surface speed of the roller 2 is constant over the whole length of the confining passage, and the fabric is reduced in length in travelling through the passage, so the fabric must move with respect to the moving confining wall formed by the surface of the lower part of the roller 2. Just after the fabric has entered at I it passes on to the lower confining wall formed by the upper surface of the plate 4, over which it initially slides at about the surface speed of the roller 1. It leaves the plate at about the speed of the surface of the roller 3, which is less than that of the roller 1, so that the rate at which the fabric slides over the plate changes between I and O as it undergoes the reduction in length.

The plate may be heated, conveniently by steam or an electrical heating element introduced into a bore 5. This facilitates the sliding of the fabric over the plate and it also heats the surfaces of the rollers by radiation, thereby increasing their grip.

As an indication of the degree of pressure to be applied to the upper roller 2, we have found that shrinking can be obtained with the comparatively light pressure of between 10 and 20 pounds per square inch on the fabric.

Any degree of shrinkage between wide limits may be obtained by varying the relative surface speeds of the rollers 1 and 3, and preferably by varying the surface speed of the roller 3 with respect to that of the roller 1 so as to maintain a constant rate of introduction. A degree of shrinkage control may also be exercised, although to a less extent, by omitting or varying the heating of the plate 4 and thus varying the surface grip of the rollers; by adjusting the pressure between the upper roller 2 and its co-operating rollers 1 and 3; or by adjusting the width of the gap between the lower part of the roller 2 and the upper surface of the plate 4. It will be understood that the adjustments of the pressure or width of the gap must always be such that the critical conditions set forth above are maintained.

Before a given length of fabric is shrunk, a sample is tested by any of the well-known standard methods in order to determine its potential shrinkage. When this has been determined, the apparatus is adjusted to give a shrinkage much in excess of this potential shrinkage, for it is our experience that the fabric will expand longitudinally to a considerable extent on leaving the nip between the rollers 2 and 3, and this must be allowed for in adjusting the surface-speed ratio between the rollers 1 and 3. The excess shrinkage required varies from fabric to fabric, being much larger in woollen and worsted fabrics than in cotton fabrics, and can be determined by experiment. This expansion of the fabric is illustrated in Figure 1 by the spacing of the transverse threads.

Three rollers and a stationary plate may be arranged in the way shown in Figure 1 without being exactly as described so far. Thus, a roller 2 with a surface that (as in the arrangement so far described) has a lower co-efficient of friction with respect to the fabric than the rollers 1 and 3 may be driven at a speed different from either of those rollers or may even be allowed to rotate freely. Again, the surfaces of the two lower rollers 1 and 3 need not have the same co-efficient of friction with relation to the fabric. For instance, the roller 1 may have a higher co-efficient of friction than the roller 3, and in this case the surface speed and the co-efficient of friction of the upper roller 2 may be the same as those of the roller 3. Alternatively the roller 3 may have a higher co-efficient of friction than the roller 1, and in this case the surface speed and the co-efficient of friction of the top roller 2 may be the same as those of the roller 1. In the former case the roller 1 takes charge of the fabric from the upper roller 2 and causes it to slip over the relatively smooth surface of that roller. In the latter case it is the roller 3 that takes charge of the fabric from the upper roller 2 and causes it to slip with respect to the relatively smooth surface of that roller.

If the rollers are not rubber-covered, the upper roller 2 may be of fairly smooth metal and geared to rotate at about the same surface speed as the roller 1, so that the cloth is fed by the nip between them, and one or both of the rollers 1 and 3 may then be of metal with knurled or roughened surfaces to enable them to grip the fabric effectively.

Further, it is not always necessary, in order to effect shrinking by such apparatus, for the feed roller 1 or the retarding roller 3 to have a surface which exerts a more powerful grip on the fabric than the surface of the upper roller 2. On the contrary the feed roller 1 or the retarding roller 3 or both of these rollers, as the case may be, may be made with a surface that has a coefficient of friction that is lower than or the same as that of the upper roller 2, provided that this feed roller or retarding roller is given a surface speed which is respectively sufficiently in excess of or sufficiently lower than that of the upper roller. Giving either roller such a speed enables it to overcome, at least partially, the grip exerted on the fabric by the upper roller and causes the fabric to slip with respect to part of the surface of the upper roller. That is to say, although the surface of the feed roller 1 may be smoother and will therefore appear to exert a less powerful grip on the fabric than the surface of the upper roller 2, it can nevertheless be made to "take charge," as it were, of the fabric from the upper roller, at least partially, if its speed is high enough. Indeed, as stated, it is possible to effect shrinking if the surfaces of all three rollers have the same co-efficient of friction (always provided that the surface speed of the retarding roller 3 is less than that of the feed roller 1) if the surface speed of the retarding roller, or of the feed roller, or of each, differs sufficiently from that of the upper roller, namely being sufficiently in excess of it in the case of the feed roller or sufficiently lower in the case of the retarding roller. However, in such an arrangement in which the surfaces of all three rollers have the same co-efficient of friction, it is necessary for the co-efficient of friction to be above a certain critical value. If it is below this value, the fabric is not gripped sufficiently powerfully at one or other nip, or at both nips, for shrinking to occur in the manner described.

The retarding roller 3, providing it has a smooth enough surface, may be rotated in the reverse direction so that its surface moves in the opposite direction to that of the fabric, in order to reduce or upset the grip the upper roller 2 would otherwise have on the fabric. Under these conditions the retarding roller exerts a more powerful retarding action on the fabric than if it were moving in the same direction and therefore only needs to make light contact with the fabric.

Figure 2:
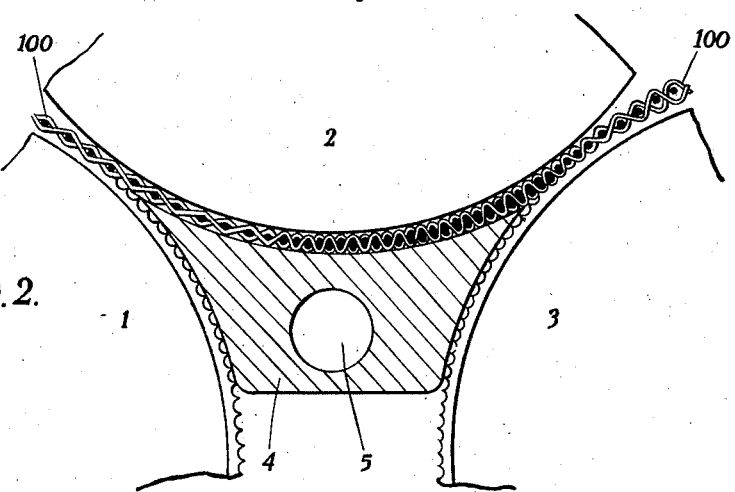
Figure 2 is a view similar to Figure 1, but illustrating the use of spiked rollers.

As has already been indicated, the rollers 1 and 3 need not act on the fabric by friction but can engage it positively. Figure 2 illustrates an arrangement of three rollers in which the rollers 1 and 3 are spiked to engage the fabric positively. It will, of course, be understood that a spiked roller cannot be employed in those forms of apparatus in which the retarding element moves in the reverse direction to that of the fabric.

Figure 3:
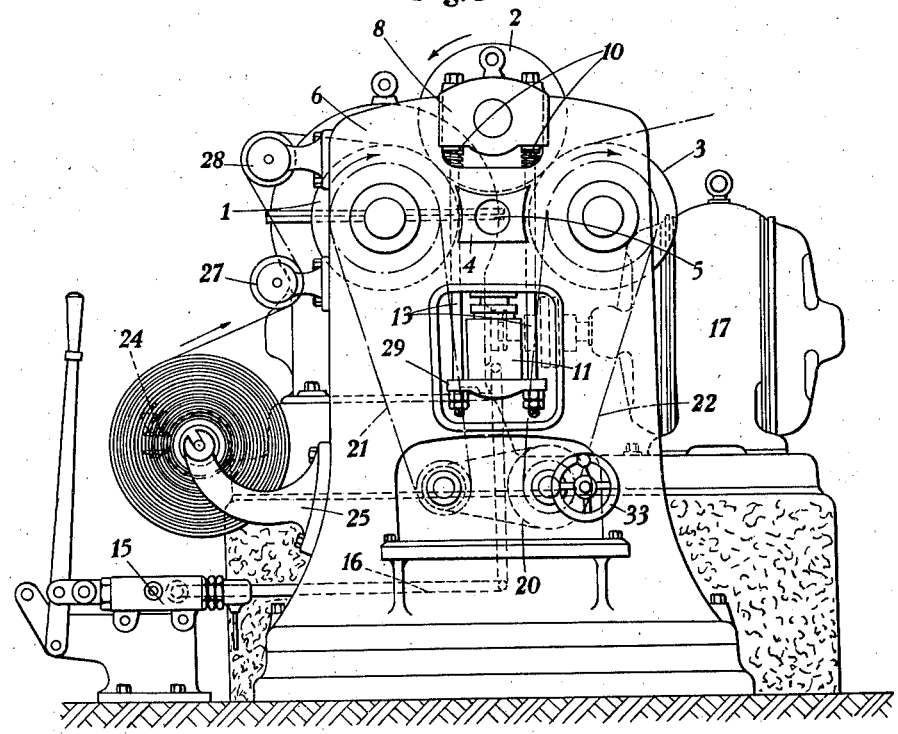
Figure 3 is a side elevation.
Figure 4:
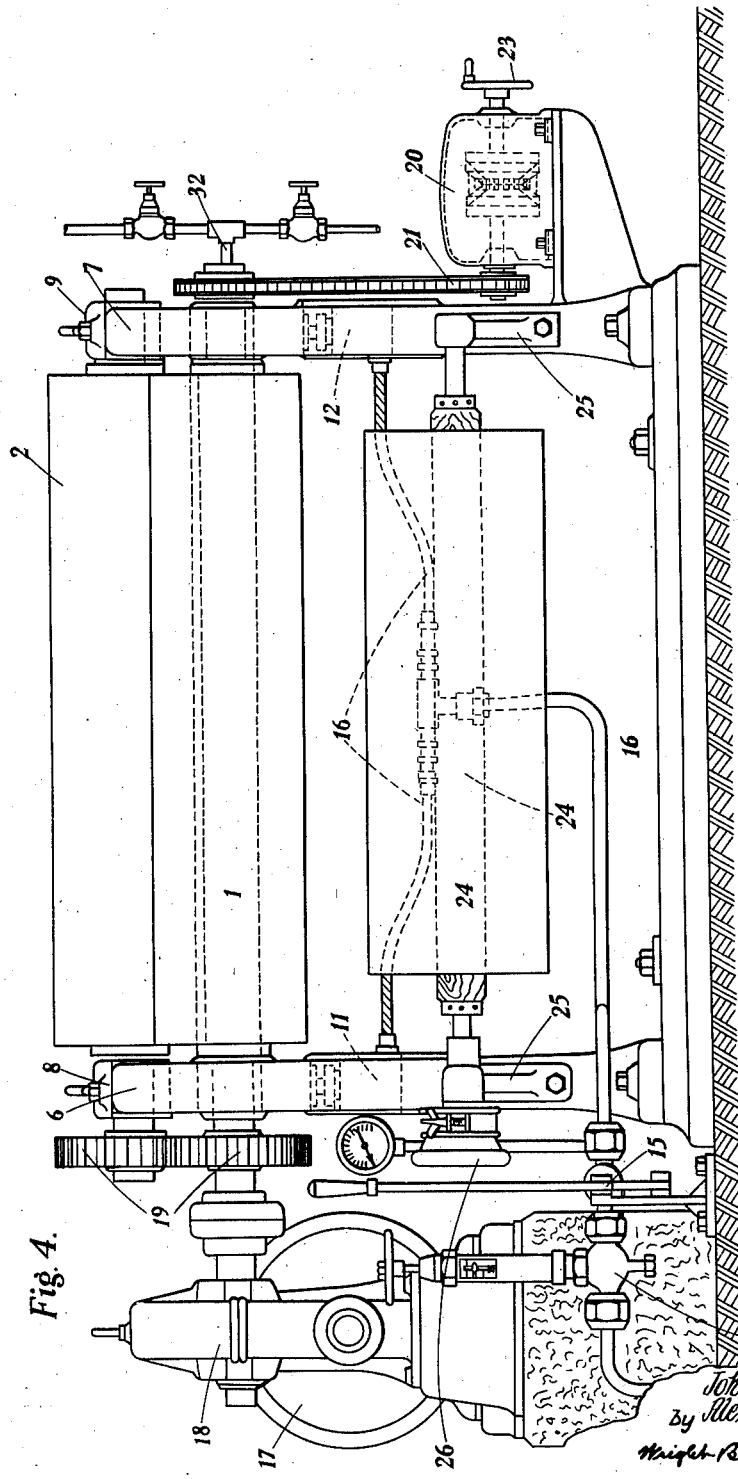
Figure 4 is a front elevation.
Figure 5:
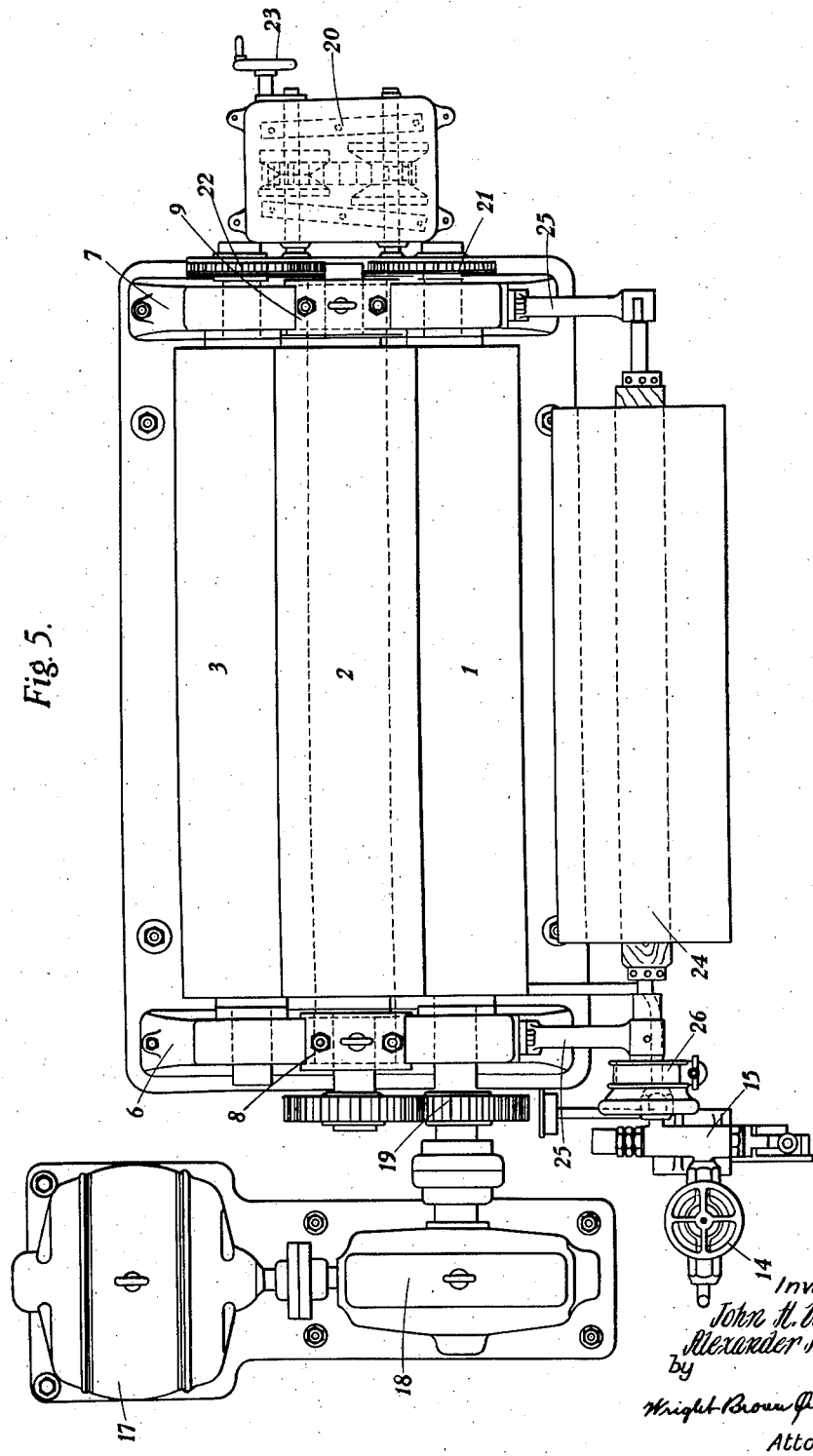
Figure 5 is a plan of apparatus embodying an arrangement of rollers working on the principle shown in Figure 1.

Figures 3 to 5 show a practical form of machine employing the arrangement of three rollers illustrated by Figure 1. The three rollers are again denoted by the numerals 1, 2 and 3 and each may have a diameter of about 12" for example. The machine has two side frames 6 and 7 which support the ends of the plate 4 and bearings for the shafts of the rollers. The bearings for the shaft of the upper roller 2 are carried in bearing blocks 8 and 9 which are capable of sliding vertically in guides formed in the frames 6 and 7. Hydraulic rams 11 and 12 are provided for the purpose of applying controllable pressure to the top roller 2. These rams are fixed in openings in the side frames 6 and 7, and each has a movable cylinder with a cross-head 29. Rods 13 extend upwards from each cross-head through openings in the frame, springs 10 and the bearing block 8 or 9, as the case may be, and are provided with nuts at their upper ends. The springs 10 bear on the frames 6 and 7 beneath the bearing blocks 8 and 9, so that when the rams are operated the rods 13 move downwards against the action of the springs 10. When the machine is put out of action and the hydraulic pressure is released, the springs lift the bearing blocks and thus raise the roller 2 well clear of the heated plate 4 and rollers 1 and 3 to prevent over-heating. Use is made of a hydraulic system, including a hydraulic accumulator, of the kind that is commonly employed in an engineering works, for supplying liquid at a suitable pressure to the rams 11 and 12. As this system may follow well-known practice, it is not illustrated except for a reducing valve 14 for varying the pressure and a hand-operated valve 15 for controlling the supply of liquid to and from the rams by means of pipes 16.

The rollers are all driven from a common source of power, in the form of an electric motor 17, through a reduction gear 18, and a variable speed gear may be interposed in the drive to the feed roller or the retarding roller or both to enable the relative speeds to be varied. In the machine shown in Figures 3 to 5, the roller 2 is driven at the same or at about the same speed as the roller 1 through gearing 19. The roller 3 is driven from the roller 1 through a hand-operated infinitely variable speed gear 20, although it may be a change-speed gear of the kind that is adjustable in a series of steps. This gear 20 provides a wide range of speed variation and may be adjusted while the machine is in motion. It is of a type that is obtainable commercially and accordingly will not be described in greater detail. Its input and output shafts are provided with chain wheels which are connected by means of chains 21 and 22 to chain wheels on the shafts of the rollers 1 and 3 respectively. The gear box, which is mounted on a bracket carried on the side of the side frame 7, is provided with a handle 23 which when rotated changes the speed-ratio between its input and output shafts so that by rotating this handle the speed of rotation of the roller 3 with respect to that of the roller 1 may be varied between wide predetermined limits. The gear should be able to change the speed-ratio between the input and output shafts so that the surface speed of the roller 3 may be from about 5% to about 60% lower than that of the roller 1. The machine may be driven at such a speed that the fabric enters it at a constant speed of about 20 yards a minute.

A steam pipe 32 shown in Figure 4 enters the opening 5 in the plate 4 for the purpose of heating it, and the plate may ordinarily be maintained at a temperature of about 200° to 300° F.

In the machine shown the fabric to be shrunk is carried in the form of a roll 24 rotatably supported in arms 25 mounted on the edges of the frames 6 and 7, although it could be taken from a wagon on which it was carried in a plaited or folded condition. The shaft carrying the roll 24 is provided with a brake device 26 for preventing the fabric from unwinding too freely. The fabric passes over guide rollers 27 and 28 to the roller 1 and then passes between the rollers 1, 2 and 3 in the manner already described with reference to Figure 1. The fabric may be steamed, damped, pre-heated, or otherwise treated prior to the shrinking operation. After shrinking, the fabric may be subjected to any desired finishing process that may be considered necessary to comply with trade requirements.

Figure 6:
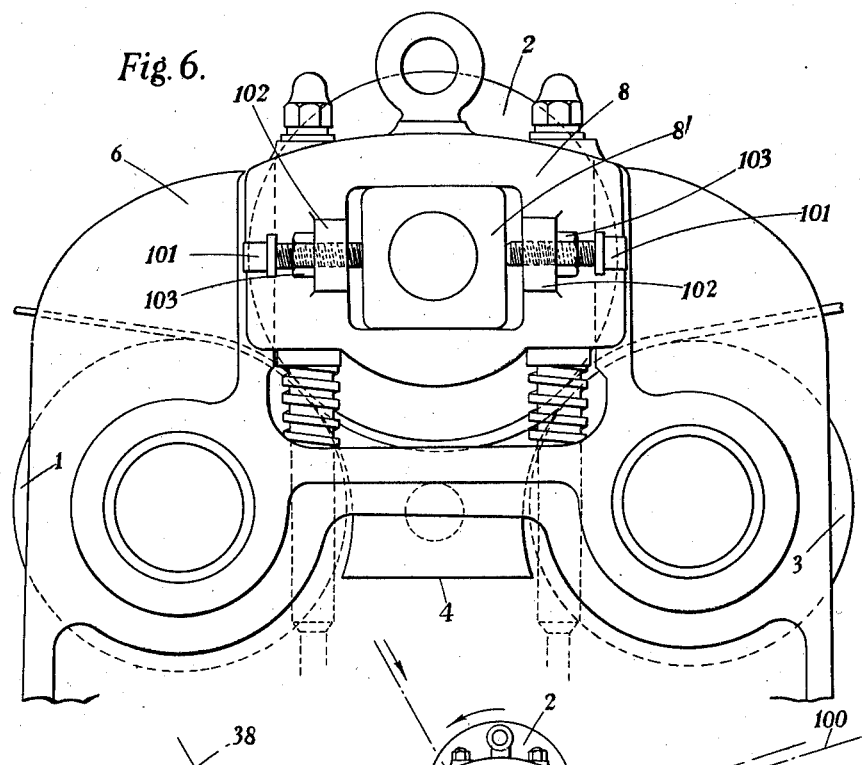
Figure 6 is a partial side elevation of an apparatus differing slightly from that of Figures 3 to 5.

It is desirable to make provision for moving the upper roller 2 horizontally, or for allowing it a certain amount of horizontal movement to enable it to align itself with respect to the surfaces of rollers 1 and 3. Figure 6 shows a modified machine in which this is done by carrying each end of the shaft of the upper roller 2 in an auxiliary bearing block 8' which is slidably mounted in the main bearing block 8. The position of the block 8' in the block 8 can be adjusted by abutment screws 101 which pass through lugs 102 and are locked by nuts 103. The screws 101 need not be in positions in which they bear against the two faces of the auxiliary bearing block 8', but the block 8' may, if desired, be allowed a certain amount of movement so that it floats in the main bearing block 8 and allows the roller 2 to accommodate itself to the rollers 1 and 3. It will be appreciated that the shape of the confining passage may be varied by adjustment of the position of the bearing block 8'.

Figure 7:
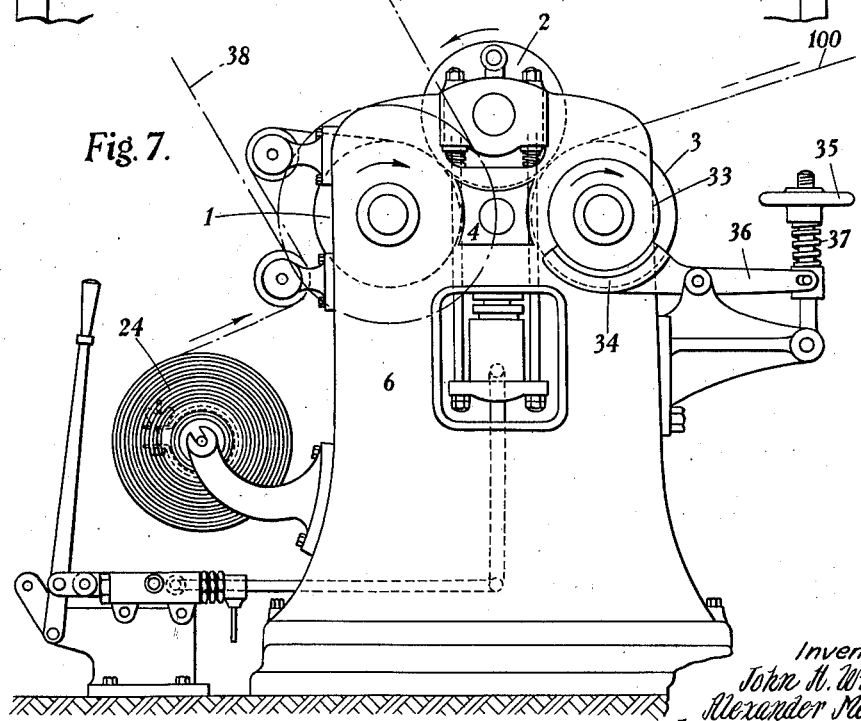
Figure 7 is a side elevation, similar to Figure 3, of another modified apparatus.

The modified form of apparatus illustrated in Figure 7 differs from that of Figures 3 to 5 mainly by reason of the fact that instead of the roller 3 being driven through a variable speed gear from the roller 1, it is frictionally driven by the roller 2 through the fabric 100, and the retardation of the fabric is effected by braking the roller 3 against the over-driving tendency of the top roller 2. For this purpose one end of the shaft of the roller 3 projects through the side frame 6, on the outside of which it is provided with a brake drum 33. A brake shoe 34 can be caused to press resiliently against the brake drum 33 to an extent that can be varied by rotation of a screw-down hand-wheel 35 which acts by way of a spring 37 on the end of a lever 36 carrying the brake shoe 34. Figure 7 also shows a belt 38, driven by a line of shafting (not shown), as the common source of power for driving the rollers, instead of an electric motor.

Figure 8:
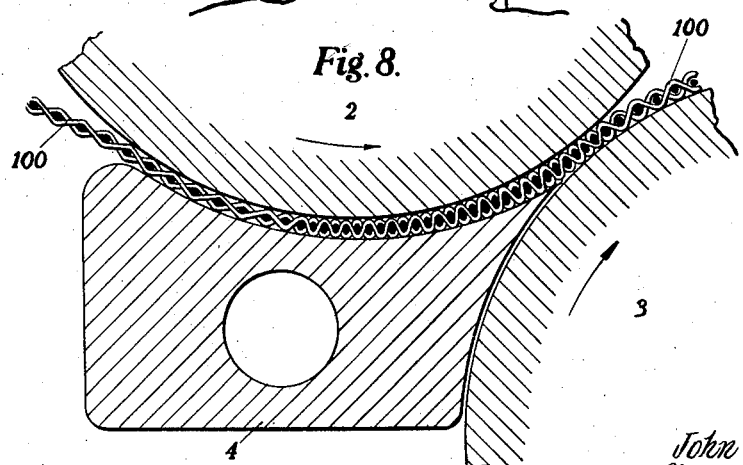
Figure 8 is a diagrammatic view, similar to Figure 1, to illustrate the operation of an apparatus with two rollers and a stationary plate.

Figure 8 illustrates in the same way as Figure 1 an arrangement which, having only two rollers instead of three, is in some ways preferable. The upper roller 2 not only forms one wall of the confining passage, but also co-operates with the front part of the plate 4 to form the introducing means. For this purpose the distance between the front part of the plate 4 and the surface of the upper roller 2 is made less than the distance between the back part of the plate and the surface of the upper roller, so as to form the first nip, and of course this arrangement gives a divergent confining passage. The surface of the roller 3 has a co-efficient of friction with respect to the fabric that gives it a more powerful grip on the fabric than the upper roller 2. On the other hand, the co-efficient of friction of the surface of the top roller 2 is such as to enable it to convey the fabric into the confining passage and over the surface of the plate 4 to the retarding roller 3, which then "takes charge" of the fabric, causing it to slip with respect to the surface of the roller 2. The top roller 2 may be covered with hard rubber, say 85°, and the bottom roller 3 may be covered with softer rubber, say 60°, as indicated by the Shore durometer, or they may both have metal surfaces, that of the bottom roller 3 being milled or otherwise roughened to give it a stronger grip on the fabric than the surface of the top roller 2. It will be understood that as there is no front bottom roller the surface of the upper roller 2 must always move faster than the surface of the retarding roller 3. Control of the shrinkage imparted to the fabric is obtained by varying the speed of the bottom roller 3 in relation to the speed of the top roller 2. The higher the shrinkage required, the slower must the surface of the bottom roller move in relation to that of the top roller. This variation in the relative speeds may be obtained by means of a hand-operated infinitely-variable speed gear coupled between the two rollers, similar to the variable speed gear arranged between the rollers 1 and 3 of Figures 3 to 5. In a machine incorporating the parts illustrated in Figure 8, pressure may be applied to the top roller 2 in the same way as in the machine shown in Figures 3 to 5, and provision may likewise be made for adjusting the horizontal position of the roller 2.

The invention may be carried into effect in many other ways and Figures 9 to 14 are diagrams illustrating some examples.

Figure 9:
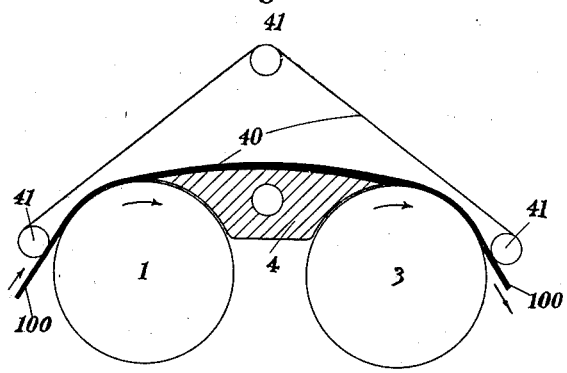
Figures 9 to 14 are diagrams illustrating the principle of operation of other forms of apparatus.
Figure 10:
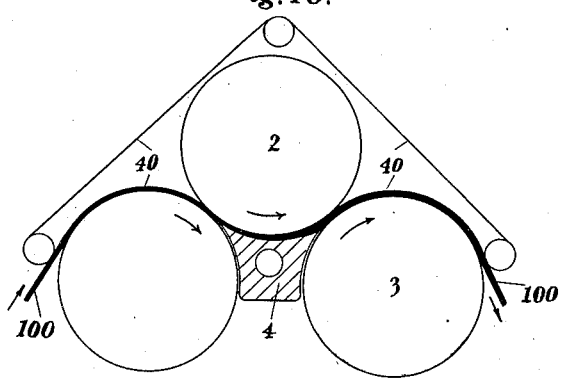
Figure 11:
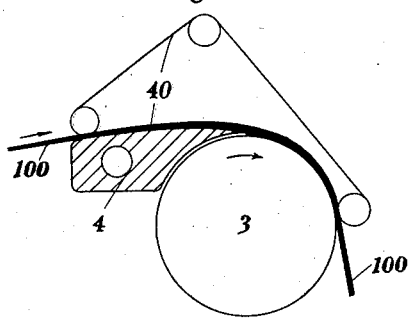

Figures 9, 10 and 11 illustrate arrangements in which the upper roller 2 of Figures 1 and 8 is replaced or supplemented by a flexible endless band 40, which may conveniently be made of metal.

Thus, in Figure 9, the upper surface of the plate 4, which forms the lower wall of the confining passage, is convex and raised so that it is above the rollers 1 and 3. One run of an endless band 40 passing over rollers 41 is arranged to pass over the upper surfaces of the two rollers 1 and 3 and over the surface of the plate 4 that lies between them. This band thus co-operates with the first roller 1 to form the introducing means, with the surface of the plate 4 to form the confining passage, and with the roller 3 to form the retarding means. Some shrinkage control may be effected by varying the tension of the band.

In Figure 10 the upper roller 2 is supplemented by an endless band 40 that passes between it and the surface of the plate 4, the band 40 then forming one wall of the confining passage, and the roller 2 giving support to it from the other side. The band 40 is so arranged that it curves over part of the periphery of both rollers as shown, and provision may be made for adjusting the length of the path over which the band makes contact.

Figure 11 illustrates the replacement of the upper roller of the arrangement shown in Figure 8 by an endless band.

The rates of movement and the co-efficient of friction of the moving elements of Figures 9, 10 and 11 may be related to one another in any of the ways described above with reference to Figure 1.

Figure 12:
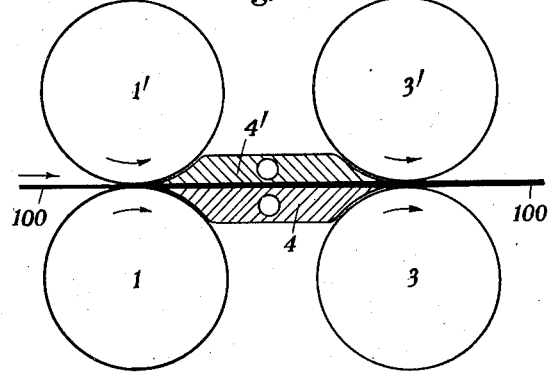

Figure 12 illustrates an arrangement in which the introducing means and the retarding means are entirely separate and both walls of the confining passage are stationary. The fabric is introduced by a pair of rollers 1, 1' which are driven at about equal surface speeds and which form the first nip. The retarding means consists of a similar pair of rollers 3, 3', which are driven at a lower surface speed than the feed rollers 1, 1' and which form the second nip. The confining passage is formed between two stationary plates 4, 4', which extend from the one nip to the other, and the inner surfaces which are tangential to the surfaces of the respective rollers.

Figure 13:
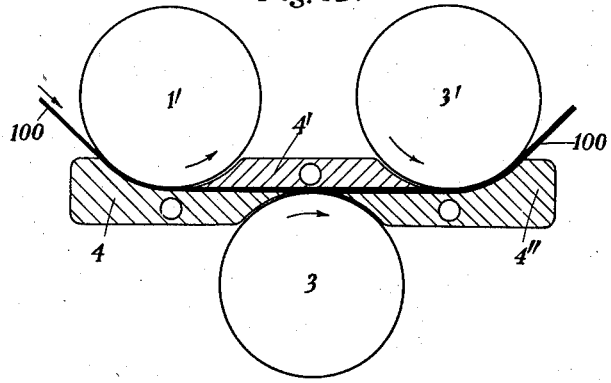

In the arrangement illustrated in Figure 13, a feed roller 1 co-operates with and has a more powerful frictional grip than the surface of a polished stationary plate 4, the fabric 100 being introduced at the nip between the roller and this stationary surface. The retarding means comprises a roller 3, rotated at a lower surface speed and having a more powerful frictional grip than the feed roller 1, and also co-operating with the surface of a stationary plate 4'. The roller 3 is arranged below the surface of the plate 4', and the confining passage is formed between the plates 4 and 4'.

The retarding means, especially in the arrangement just described, may be followed by further retarding means if a second stage of shrinkage is required. In the arrangement of Figure 13, there is such a second retarding means, comprising a roller 3' rotated at a still lower surface speed and having a more powerful frictional grip than the roller 3. This roller 3' is arranged above and co-operates with the surface of a further stationary plate 4" to form the second retarding means, and a second confining passage is formed between the plates 4' and 4". Thus the first retarding means forms the introducing means for the second stage of shrinkage. The surfaces of the three rollers must each have a more powerful frictional grip than the surfaces of their co-operating plates. In this arrangement involving two stages of shrinkage, two variable speed gears may be employed, one to regulate the speed ratio between the first top roller 1 and the bottom roller 3, and one to regulate the speed ratio between the bottom roller 3 and the second top roller 3'.

Retarding means including a stationary surface may be provided in the arrangements of Figures 1 and 8 to 11 by holding the retarding roller or other element so that it remains stationary or else is allowed to rotate or move at such a slow speed that, while being virtually stationary with respect to the fabric, it continually presents a fresh portion of its surface to the fabric so as to equalise wear all round. Such a movement can be brought about in the apparatus shown in Figure 7 by appropriate use of the brake. However, other arrangements in which the retarding means comprises a permanently stationary retarding surface may be employed and one arrangement of this kind is illustrated in Figure 14.

Figure 14:
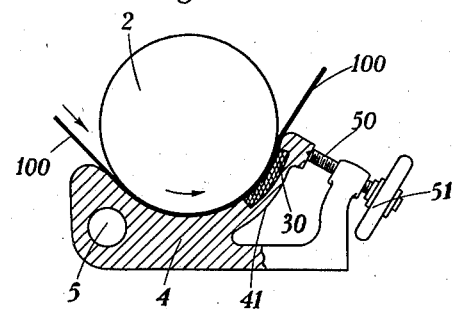

In the arrangement of Figure 14, the introducing means and confining passage are similar to those of Figure 8, being formed by a roller 2 and plate 4. The roller 3 of Figure 8 is, however, replaced by a stationary retarding element 30, which is preferably made of the kind of material used for clutch facings and which is inset in a recess in the plate so that its upper surface forms in effect part of the surface of the plate. The movement of the fabric over the fixed retarding surface does not depend wholly upon the frictional grip of the roller 2 at this point, since as in other forms of apparatus it is urged forwards through the thickened part of its length in the confining passage by the introducing means, and the longitudinal pressure thus exerted aids in forcing it over the retarding surface 30. It is desirable to be able to adjust the retarding element in a direction towards or away from the roller 2 in order to control the shrinkage, and for this purpose the part 41 of the plate 4 in which the element is set is made capable of flexing slightly with respect to the remainder of the plate and a screw 50 rotatable by a hand-wheel 51 is provided for adjusting it.

The stationary retarding element need not be separate from the remainder of the stationary confining wall, but may be formed by roughening part of the surface of the plate. Thus, it may consist of a milled or etched portion on the surface of a polished metal plate. Again, the co-efficient of friction of the surface of the plate 4 with respect to the fabric may be made to increase gradually from the end at which the fabric enters to the end at which it leaves. Thus, the plate may be faced with rubber which is vulcanised and polished where the fabric enters and which gradually changes to a softer condition to form part of the retarding means.

We claim:

1. The method of shrinking textile fabric material which comprises causing said material to travel lengthwise, reducing the speed at which said material travels at one point in the direction of travel in comparison with that at an earlier point, and between said points confining said fabric sufficiently to prevent it from buckling as a whole but with freedom over its entire surface to slip relative to the confining means for self-adjustment to become thicker and shorter.

2. The method of shrinking textile fabric material, which comprises causing said material to travel lengthwise, nipping said material at one position along its length and substantially continuously throughout its width to control its speed of travel at said position, nipping said material at another position further along its length in the direction of travel and substantially continuously throughout its width to cause it to travel more slowly at said second position than at said first position, and confining the material between said positions sufficiently to prevent it from buckling as a whole but with freedom over its entire surface to slip relative to the confining means for self-adjustment to become thicker and shorter.

3. A textile shrinking apparatus, which comprises a pair of textile feeding means spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls substantially continuous widthwise of the material and between which said material passes from said first to said second feeding means, said walls diverging toward said second feeding means and spaced apart at a distance such as to confine the textile material and prevent buckling while permitting the textile material to slip relative to said walls and to thicken as it passes from the first to the second of said feeding means.

4. A textile shrinking apparatus, which comprises a pair of textile feeding means spaced apart in the direction of feed and each engaging the textile substantially continuously across its width, means for driving the first of said feeding means at a higher rate of feeding speed and the second of said feeding means at a lower rate of speed, said apparatus also including laterally spaced guiding walls substantially continuous widthwise of the material and between which said material passes from said first to said second feeding means, said walls diverging toward said second feeding means and spaced apart at a distance such as to confine the textile material and prevent buckling while permitting the textile material to slip relative to both walls and to thicken as it passes from the first to the second of said feeding means, said second feeding means comprising a pair of spaced movable surface members between which said textile material is gripped.

5. A textile shrinking apparatus, which comprises a pair of textile feeding means spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls at least substantially continuous widthwise across the material and between which said material passes from said first to said second feeding means, said walls diverging toward said second feeding means and spaced apart at a distance such as to confine the textile material and prevent buckling while permitting the textile material to slip relative to said walls and to thicken as it passes from the first to the second of said feeding means, and means for supporting one of said wall members for yielding away from another of said wall members.

6. A textile shrinking apparatus, which comprises a pair of textile feeding means spaced apart in the direction of feed, and each engaging the textile substantially continuously across its width, means for driving the first of said feeding means at a higher rate of feeding speed and the second of said feeding means at a lower rate of feeding speed, said apparatus also including laterally spaced guiding walls at least substantially continuous widthwise and between which said material passes from said first to said second feeding means, said walls diverging toward said second feeding means and spaced apart at a distance such as to confine the textile material and prevent buckling while permitting the textile material to slip relative to said walls and to thicken as it passes from the first to the second of said feeding means, one of said wall members having a facing of yielding material presented toward the textile material.

7. A textile shrinking apparatus, which comprises a pair of textile feeding means comprising moving surface members spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls substantially continuous widthwise and between which said material passes from said first to said second feeding means, said walls diverging toward said second feeding means and spaced apart at a distance such as to confine the textile material and prevent buckling while permitting the textile material to slide relative to said walls and to thicken as it passes from the first to the second of said feeding means, certain of said moving surface members comprising endless belts.

8. A textile shrinking apparatus, which comprises a pair of textile feeding means comprising moving surface members spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls substantially continuous widthwise and between which said material passes from said first to said second feeding means, said walls diverging toward said second feeding means and spaced apart at a distance such as to confine the textile material and prevent buckling while permitting the textile material to slide relative to said walls and to thicken as it passes from the first to the second of said feeding means, certain of said moving surface members comprising endless belts, and means supporting the outer faces of said belts and holding them in proper textile confining positions.

9. A textile shrinking apparatus, which comprises a pair of textile feeding means comprising moving surface members spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls extending substantially continuously widthwise and between which said material passes from said first to said second feeding means, said walls diverging toward said second feeding means and spaced apart at a distance such as to confine the textile material and prevent buckling while permitting the textile material to slip relative to said walls and thicken as it passes from the first to the second of said feeding means, certain of said moving surface members comprising rollers.

10. A textile shrinking apparatus, which comprises a pair of textile feeding means comprising moving surface members spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls substantially continuous widthwise of the material and between which said material passes from said first to said second feeding means, said walls diverging toward said second feeding means and spaced apart at a distance such as to confine the textile material and prevent buckling while permitting the textile material to slip relative to said walls and to thicken as it passes from the first to the second of said feeding means, and means for adjusting relative rates of said feeding speeds of said movable surface members.

11. A textile shrinking apparatus, which comprises a pair of textile feeding means comprising moving surface members spaced apart in the direction of feed and each engaging the textile substantially continuously across its width, means for driving the first of said feeding means at a higher rate of feeding speed and the second of said feeding means at a lower rate of feeding speed, said apparatus also including laterally spaced guiding walls substantially continuous widthwise of the material and between which said material passes from said first to said second feeding means, said walls diverging toward said second feeding means and spaced apart at a distance such as to confine the textile material and prevent buckling while permitting the textile material to slip relative to said walls and to thicken as it passes from the first to the second of said feeding means, said driving means including connections to at least one of said guiding walls moving said wall at a lower surface speed than said first feeding means.

12. A textile shrinking machine comprising opposed wall members defining a passage through which the textile material may pass, said wall members being substantially continuous throughout the width of the textile material and sufficiently close together with respect to the thickness of the material to prevent buckling thereof as a whole and sufficiently smooth to permit slippage of said material relative to said opposed wall members and thickening of the material, and means engaging and feeding the textile material into said passage at a relatively high speed at one end, and means for feeding said material out of said passage at the other end at a lower speed.

13. A textile shrinking machine comprising opposed widthwise continuous wall members defining a passage through which the textile material may pass, said wall members being sufficiently close together with respect to the thickness of the material to prevent buckling thereof as a whole and sufficiently smooth to permit slippage of the material relative thereto and thickening of the material, means engaging and feeding the textile material into said passage at a relatively high speed at one end, and means for feeding said material out of said passage at said other end at a lower speed, one of said wall members being stationary, and another of said wall members being movable in the direction of travel of said textile material.

14. A textile shrinking machine comprising opposed widthwise wall members defining a passage through which the textile material may pass, said wall members being sufficiently close together with respect to the thickness of the material to prevent buckling thereof as a whole and sufficiently smooth to permit slippage of the material relative thereto and thickening of the material, means engaging the textile material throughout substantially its entire width and feeding the textile material into said passage at a relatively high speed at one end, and means engaging material throughout substantially its entire width for feeding said material out of said passage at the other end at a lower speed, one of said wall members being stationary and presenting a smooth surface, and another of said wall members being movable in the direction of travel of said textile material and having a less smooth surface, said movable wall member forming a portion of one of said feeding means.

15. A textile shrinking machine comprising opposed widthwise continuous wall members defining a passage through which the textile material may pass, said wall members being sufficiently close together with respect to the thickness of the material to prevent buckling thereof as a whole and sufficiently smooth to permit slippage of the material relative thereto and thickening of such material, means engaging the textile material throughout substantially its entire width and feeding it into said passage at a relatively high speed at one end, and means for engaging the textile material throughout substantially its entire width for feeding material out of said passage at the other end at a lower speed, one of said wall members presenting a wall surface yieldable from another of said wall members.

16. A textile shrinking machine comprising opposed widthwise continuous wall members defining a passage through which the textile material passes, means for moving one of said wall members in the direction of travel of the material, movable means cooperating with said movable wall member and engaging the material throughout substantially its entire width for feeding the material into said passage at one end, another means cooperating with said movable wall member and engaging the material throughout substantially its entire width at the opposite end of said passage for feeding the material out from said passage, and mechanism for driving said two material engaging means at differential rates of speed with said last mentioned means at the lower rate.

17. Apparatus for shrinking textile material comprising a smooth surfaced plate, a roller cooperating with said plate to define therewith a widthwise continuous passage through which the material may travel, said passage being sufficiently constricted to prevent buckling of the material as a whole, a second roller cooperating with said plate to form means for introducing said material into said passage, and a third roller cooperating with said plate to form means to grip the material as it passes out from said passage, and means for rotating all of said rollers with said first and second mentioned rollers at a greater peripheral velocity than said third roller, said first-mentioned roller having a smooth surface permitting slippage of the material thereover.

18. Apparatus for shrinking textile material which comprises a roller, a stationary plate cooperating with said roller to form a passage therebetween substantially continuous crosswise of the material and of increasing spacing in one direction and through which said material may pass and sufficiently constricted to prevent buckling of the textile material therein, said plate having a relatively smooth surface for engagement with the material where said spacing is least, and provided with a surface presenting a greater coefficient of friction with the textile material at the more widely spaced portion of said passage, and means for rotating said roller in the direction to impel the textile material inserted in said more narrowly spaced end of said passage through said passage.

19. Apparatus for shrinking textile material which comprises a roller, a stationary plate cooperating with said roller to form a passage therebetween continuous widthwise of the material and of increasing spacing in one direction and through which said textile material may pass, said plate having a relatively smooth surface for engagement with the material where said spacing is least, and provided with a surface presenting a greater coefficient of friction with the textile material at the more widely spaced portion of said passage, means for rotating said roller in the direction to impel the textile material inserted in said more narrowly spaced end of said passage through said passage, and means for removing the textile material from said more widely spaced end at a speed less than that at which it was impelled into said passage.

20. A textile shrinking apparatus, which comprises a pair of textile feeding means spaced apart in the direction of feed, means for driving the first of said feeding means at a higher rate of speed and the second of said feeding means at a lower rate of feeding speed, a confining passage through which textile material passes between said pairs of feeding means having walls spaced sufficiently closely together to prevent buckling of the textile material while permitting it to slip relative thereto, one wall of said passage comprising a moving roller and the opposite wall comprising a stationary surface member, one of said feeding means comprising a driven roller having a surface opposed to a face of said moving roller.

21. A textile shrinking apparatus, which comprises a pair of textile feeding means spaced apart in the direction of feed, means for driving the first of said feeding means at a higher rate of speed and the second of said feeding means at a lower rate of feeding speed, a confining passage through which textile material passes between said pairs of feeding means having walls spaced sufficiently closely together to prevent buckling of the textile material while permitting it to slip relative thereto, one wall of said passage comprising a moving roller and the opposite wall comprising a stationary surface member, said feeding means comprising driven rollers having surfaces opposed to a face of said moving roller at each end of said stationary surface member.

JOHN H. WRIGLEY.
ALEXANDER MELVILLE.